Figures 1, 2:
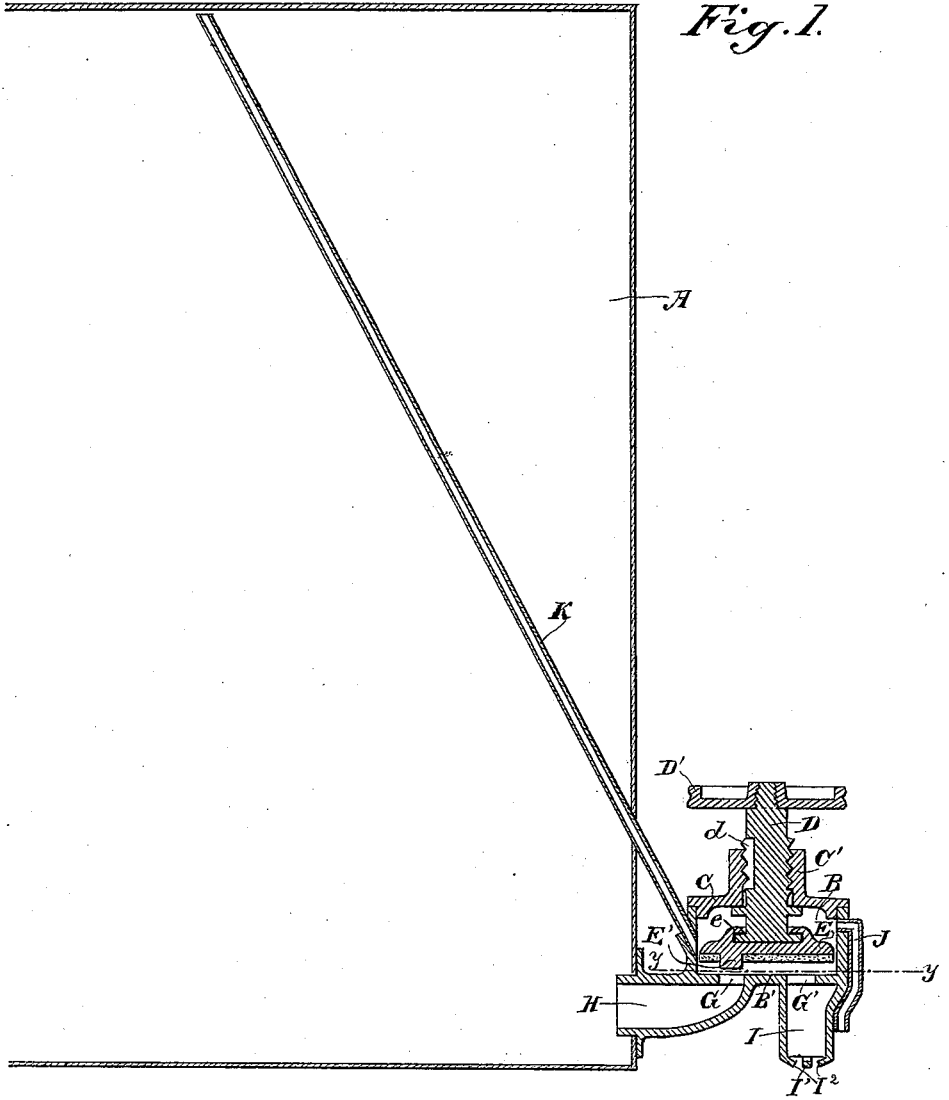

(No Model.)

A. H. & T. A. SCHLUETER.
FAUCET.

No. 540,844. Patented June 11, 1895.

Witnesses,

Inventors,
Adolph H. Schlueter
Theodore A. Schlueter
By Dewey & Co.
Attys

UNITED STATES PATENT OFFICE.

ADOLPH H. SCHLUETER AND THEODORE A. SCHLUETER, OF OAKLAND, CALIFORNIA.

FAUCET.

SPECIFICATION forming part of Letters Patent No. 540,844, dated June 11, 1895.

Application filed July 26, 1894. Serial No. 518,673. (No model.)

*To all whom it may concern:*

Be it known that we, ADOLPH H. SCHLUETER and THEODORE A. SCHLUETER, citizens of the United States, residing in Oakland, Alameda county, State of California, have invented an Improvement in Faucets; and we hereby declare the following to be a full, clear, and exact description of the same.

Our invention relates to certain improvements in faucets of that class which are adapted to be attached to closed vessels of various descriptions, so that the contents of the vessel may be removed from time to time as required.

It consists in certain details of construction which will be more fully explained by reference to the accompanying drawings, in which—

Figure 1 is a sectional view of a containing-vessel with our faucet attached. Fig. 2 is a horizontal section on line $y\ y$ of Fig. 1, showing the seat upon which the valve closes.

The object of our invention is to provide a faucet which is especially applicable to coal-oil cans, by the use of which faucet, a lamp or other receptacle may be filled directly from the faucet and will not overflow while filling, the structure of the faucet being of such a nature that after the filling, the faucet closed, and the lamp removed, there will be no leak or drip from the faucet.

A is a containing vessel or can of any description, which must be air-tight. The faucet consists of a chamber B having a cap C fitting upon the top, making a tight joint, and this cap has a central sleeve or extension C′ which is screw-threaded on the inside to receive the stem D of the faucet which is correspondingly screw-threaded so that when it is turned by means of the milled head D′, it will rise or fall by reason of the screw-threads. In the side of this stem is made a channel $d$ of such length that when the stem is screwed down to close the valve, it will make an air connection between the outside and the chamber B, so that air can freely enter the chamber, but when the stem is screwed up in opening the valve, this source of communication is cut off, and the chamber receives no air from this passage.

The valve E is formed with a flange $e$ around the top, and the faucet stem has a corresponding flange projecting into the channel under the flange $e$ and turnable loosely within it, so that the valve does not necessarily partake of the movement of the stem when the latter is turned. The valve has a flat face which is preferably covered with cork or other suitable material which will make a joint upon the flat seat and will not be attacked or injuriously acted upon by the coal oil or other liquid which passes.

The bottom of the chamber B has a flat seat B′ with two openings made in it as shown at G and G′. The opening G connects with a passage H leading into the can. The tube through which this passage is formed is properly constructed to be secured to the can near the bottom, so that liquid may pass from the can through this passage H, thence up through the opening G when the valve is raised, and thence it passes out through the opening G′ and into the discharge tube I which extends downwardly a short distance below this opening.

J is a tube, the upper end of which opens into the chamber B, and the lower end extends down alongside the tube I to near its bottom.

K is a tube leading from the side of the chamber B adjacent to the vessel A, and passing through the side of this vessel it extends up to the top of the interior of the vessel, terminating just within the top and above the level of the liquid.

The lower end of the tube I is formed with prongs I² or inwardly projecting points, or a transverse bar, as shown at I′, and these serve to prevent any small quantity of liquid remaining in the tube after the valve has been closed, from dropping out, acting by capillary attraction.

The operation of the faucet will then be as follows: The vessel to be filled is brought beneath the spout I, and raised up close against the bottom of the faucet. The valve is opened by turning the milled head or handle upon the upper end of the valve stem, and this raises the valve above the valve seat. Owing to the pressure exerted by reason of the weight of the liquid within the vessel, it will flow into the chamber B faster than it can escape from the spout I, therefore, it will rise within this chamber, and prevent the entrance of air into the vessel A through the pipes J and K. This produces a partial vacuum in the chamber A which is sufficient to prevent the liquid from flowing too quickly into the faucet. The liquid in the chamber B will then drop low enough to allow air to enter through the pipe J, and thence through the pipe K into the chamber A, thus supplying the place of the liquid which is being withdrawn. As soon as the liquid fills the lamp or other vessel up to a point level with the bottom of the air pipe J, the air supply will be cut off, and this, forming a vacuum in the chamber A, will prevent any further flow of liquid through the passages G and G'. As soon as the valve stem D is turned to close the valve, the passage d in the side of the stem is moved down far enough to make an opening from the outside into the chamber B of the faucet, and this allows any liquid remaining in the chamber to flow out leaving the faucet comparatively clear, so that when the valve is closed, it closes down upon the valve seat, shutting both the openings G and G', and prevents any dripping from the chamber B. The inwardly extending prongs or bar I' of the tube I, by reason of the capillary attraction, will not allow the air to displace liquid in spout I. Consequently, there will be no drip. The openings in the valve seat are preferably made, as shown in the plan view, and the valve may have upon one side a projection E' corresponding with the shape of the passage G and extending downward sufficiently far below the valve face, so that it enters the opening G before the valve fairly closes. When the valve is opened, it will be seen that the passage G' will be fully opened, while the passage G is partially obstructed, and this prevents a too great rush of liquid from the can into the faucet chamber B, before the discharge passage is fully opened.

It will be seen that the faucet may be made without the air tubes. It may be made with the single valve and the seat with the two openings, and will in either case prevent seepage.

Having thus described our invention, what we claim as new, and desire to secure by Letters Patent, is—

1. A faucet consisting of a valve chamber having its top closed by a cap and its bottom formed as a flat seat horizontally disposed and provided with two separate openings, with passages below the seat connecting the openings with the containing can and discharge spout of the faucet respectively, a valve in the chamber above the seat adapted to expose or close both openings simultaneously, a stem for operating the valve and separate tubes leading from the exterior to the air chamber above the valve and from the said chamber to the space in the can above the surface of the liquid.

2. A faucet, consisting of a valve chamber with a closed cap and screw-threaded extension, a valve stem screw-threaded so as to move up and down, a valve loosely connected with the lower end of the valve stem to be movable with it having a flat face, a corresponding flat seat made in the bottom of the valve chamber of the faucet having a segmental opening made in one side communicating by passage with the interior of the receptacle, a correspondingly shaped opening in the opposite side of the valve seat connecting with a discharge spout, an air tube extending upwardly alongside the discharge spout and opening into the valve chamber above the valve, a second tube opening into the opposite side of the valve chamber and extending therefrom into the can and up to a point above the surface of the liquid therein.

3. A faucet consisting of a closed chamber having a flat seat with segmental openings upon opposite sides, one of said openings connecting through a passage with the interior of the vessel to which the faucet is attached, and the other one connecting with a discharge spout, a valve adapted to close both of said openings simultaneously, having a screw stem by the turning of which it is opened and closed, an air passage or channel formed in the side of the screw stem which admits air into the valve chamber when the valve is closed and which is cut off therefrom when the valve is opened, an air passage extending from the interior of the valve chamber alongside the discharge spout to near its lower end, a second pipe extending from the opposite side of the valve chamber into the can and thence to the top above the surface of the liquid, and a lug projecting from the bottom of the valve face corresponding with the inlet opening and adapted to enter said opening when the valve is closed and to be withdrawn therefrom after the discharge opening has been fully exposed by the opening of the valve.

In witness whereof we have hereunto set our hands.

ADOLPH H. SCHLUETER.
THEODORE A. SCHLUETER.

Witnesses:
L. L. M. SALSBURY,
JOHN P. BECKETT.